United States Patent
Sandor et al.

[11] Patent Number: 5,964,362
[45] Date of Patent: *Oct. 12, 1999

[54] BLOW MOLDED CONTAINER STRUCTURE, CAP THEREFORE AND METHOD OF FORMING SAID NECK

[75] Inventors: Laszlo G. Sandor, Fremont; Daniel Luch, Morgan Hill; Richard E. Repp, San Jose, all of Calif.

[73] Assignee: Portola Packaging, Inc., San Jose, Calif.

[*] Notice: This patent is subject to a terminal disclaimer.

[21] Appl. No.: 08/847,928

[22] Filed: Apr. 28, 1997

Related U.S. Application Data

[63] Continuation of application No. 08/385,808, Feb. 9, 1995, abandoned.

[51] Int. Cl.⁶ .................... B65D 41/48; B29C 25/00
[52] U.S. Cl. .................... 215/43; 215/45; 215/344; 264/536
[58] Field of Search .................... 215/43–45, 256, 215/252, 343, 344, 354; 206/508, 509; 264/536, 533, 531, 163; 425/525, 527, 289, 292, 296, 298, 308, 310

[56] References Cited

U.S. PATENT DOCUMENTS

| | | | |
|---|---|---|---|
| 3,784,038 | 1/1974 | Uhlig | 215/44 |
| 3,899,279 | 8/1975 | Hudson et al. | 425/387 B |
| 3,940,004 | 2/1976 | Faulstich | 215/256 |
| 4,037,748 | 7/1977 | Stubbs, Jr. | 215/256 |
| 4,066,182 | 1/1978 | Allen et al. | 215/256 |
| 4,187,070 | 2/1980 | Martin | 425/525 |
| 4,202,455 | 5/1980 | Faulstich | 215/31 |
| 4,296,871 | 10/1981 | Andersson | 206/508 X |
| 4,298,129 | 11/1981 | Stull . | |
| 4,305,517 | 12/1981 | Dennis | 215/256 |
| 4,354,609 | 10/1982 | Hidding . | |
| 4,384,654 | 5/1983 | Hospes | 215/256 |
| 4,402,451 | 9/1983 | Woerz et al. | 229/509 |
| 4,496,066 | 1/1985 | Bullock, III | 215/43 X |
| 4,625,876 | 12/1986 | Bullock . | |
| 4,691,834 | 9/1987 | Bullock . | |
| 4,699,285 | 10/1987 | Perne et al. | 215/44 X |
| 4,798,301 | 1/1989 | Bullock . | |
| 4,828,128 | 5/1989 | Tackles | 215/256 |
| 4,844,268 | 7/1989 | Bullock, III | 215/256 |
| 4,903,849 | 2/1990 | Wallman | 215/256 |
| 4,934,546 | 6/1990 | Markley | 215/256 |
| 5,036,991 | 8/1991 | Wallman | 215/256 |
| 5,213,224 | 5/1993 | Luch | 215/256 |
| 5,373,955 | 12/1994 | Marino | 215/256 |
| 5,383,558 | 1/1995 | Wilkinson et al. | 215/344 X |
| 5,456,376 | 10/1995 | Luch et al. | 215/256 |

FOREIGN PATENT DOCUMENTS

| | | | |
|---|---|---|---|
| 2103990 | 3/1983 | United Kingdom | 264/536 |

*Primary Examiner*—Stephen K. Cronin
*Assistant Examiner*—Nathan Newhouse
*Attorney, Agent, or Firm*—Julian Caplan; Flehr Hohbach Test; Albritton & Herbert LLP

[57] ABSTRACT

The neck of a container has a smooth seal surface engaged by the inner skirt or plug of a cap. Such surface is free of trim and parting line flaws which are characteristic of blow-molded jars because the surface is formed in such a way that the seal surface is not in contact with mold parting lines and further the trim of the neck (excess plastic) is located away from the sealing surface. In one form of the disclosure, above the sealing surface the neck wall slants outward and then bends upward-inward in a short, tapered stretch about 18° to the horizontal which engages the underside of the cap disk to compress against the disk or a liner or foil. In another form of the invention, above the seal surface the neck extends outward and the upward and then inward in a flange which is trimmed along a line which has a circumference no less than the circumference of the seal surface. The exterior of the neck is formed with shoulders which engage over locking beads on the interior of the outer skirt of the cap.

22 Claims, 6 Drawing Sheets

BLOW MOLDED CONTAINER STRUCTURE, CAP THEREFORE AND METHOD OF FORMING SAID NECK

CROSS REFERENCE TO RELATED APPLICATIONS

This application is a File Wrapper Continuation of U.S. application Ser. No. 08/385,808, filed Feb. 9, 1995 now abandoned.

BACKGROUND OF THE INVENTION

1. Field of the Invention

This invention relates to a new and improved blow molded neck construction for bottle or other container, a cap therefor and method of forming said neck. More particularly, it relates to the neck finish for a blow molded plastic bottle characterized by the fact that when used with a cap having a plug (i.e., inner skirt) the surface of the neck against which the plug seals is a seal surface without parting lines and a portion above the seal surface comprises an inward directed thin flexible flange.

2. Description of Related Art

An exemplar of the prior art is U.S. Pat. No. 4,691,834 which shows an upward inward directed flexible flange sealing against the corner of the intersection of the outer wall of the plug and the underside of the top of the cap. The neck sealing surface is, inherently, somewhat uneven and ragged since the neck is cut or sheared adjacent this sealing surface. In the present invention, however, the neck is trimmed at the edge of the upper flexible flange but such edge is not the portion of the neck which seals against the cap plug.

The references cited against said U.S. Pat. No. 4,691,834 are likewise distinguishable.

U.S. Pat. Nos. 4,625,876 and 4,798,301 show curved plug contacting surfaces but these are of substantially the same diameters as the inner edge of the flanges which engage the underside of the top of the cap.

SUMMARY OF THE INVENTION

The bottle of the present invention is blow molded in a split mold by techniques well known in the art. The surfaces of the mold which define the neck structure cause the neck shape hereinafter described. An upper portion of the parison above the neck is trimmed or cut from the neck according to conventional practice (e.g. pull-up trim, spin trim, etc.) The circle at which the upper portion of the parison is severed from the neck is the inner edge of an inward upward slanted flange. The other end of the flange merges into a curved surface which extends inward a greater distance than the aforesaid edge to merge with an internal sealing surface of lesser diameter than said edge. The neck structure above the neck sealing surface has rapidly changing diameters which form a flexible membrane due to parison stretching in the blow molding process. Below the sealing surface the exterior of the neck structure slants downward outward to a horizontal shoulder and then extends downwardly and then outwardly to a second or lower shoulder.

The cap with which the neck is used has a top having a depending central plug or inner skirt, the outer surface of which seals tightly against the sealing surface of the neck. The cap also has an outer skirt having internal sealing beads which engage the upper and lower shoulders of the neck to hold the cap in place. The lower portion of the outer cap skirt may be removed by the user engaging and pulling a pull tab which causes the lower part of the skirt to disengage at a circumferential score line. Until such lower skirt is removed, the cap and neck are tamper-evident.

The accompanying drawings, which are incorporated in and form a part of this specification, illustrate embodiments of the invention and, together with the description, serve to explain the principles of the invention:

DESCRIPTION OF THE PREFERRED EMBODIMENT

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
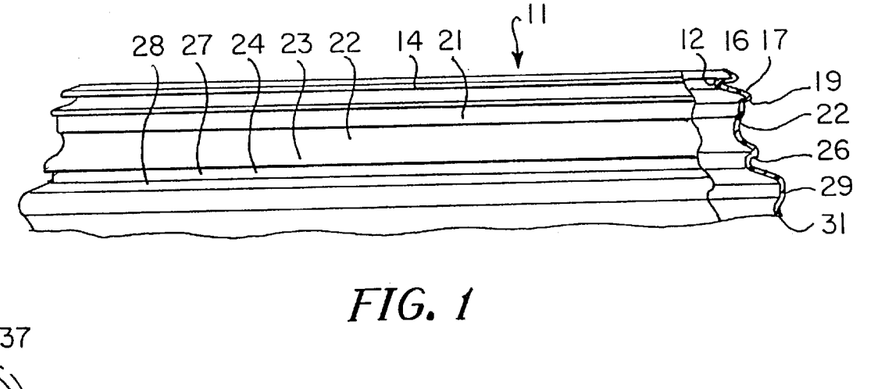
FIG. 1 is a side elevational view of a neck portion of a jar in accordance with the present invention partially broken away to reveal structure.
Figure 2:
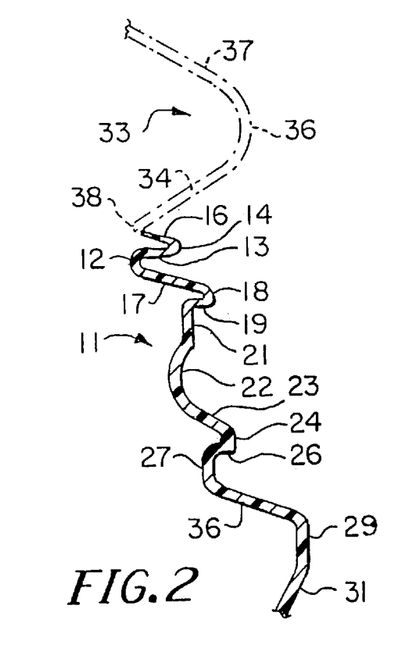
FIG. 2 is an enlarged sectional view of the neck structure and a portion of a blow dome superimposed thereabove.
Figure 3:
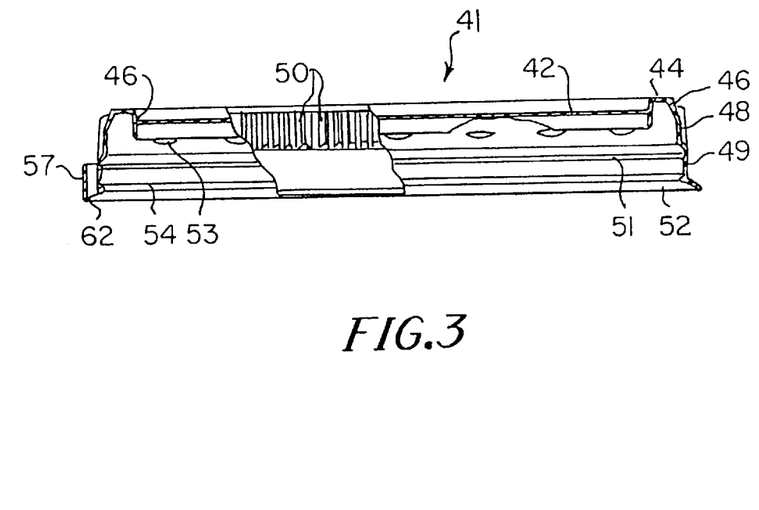
FIG. 3 is a side elevational view of a cap with which the neck is used, the cap being partially broken away in section to reveal internal construction.
Figure 4:
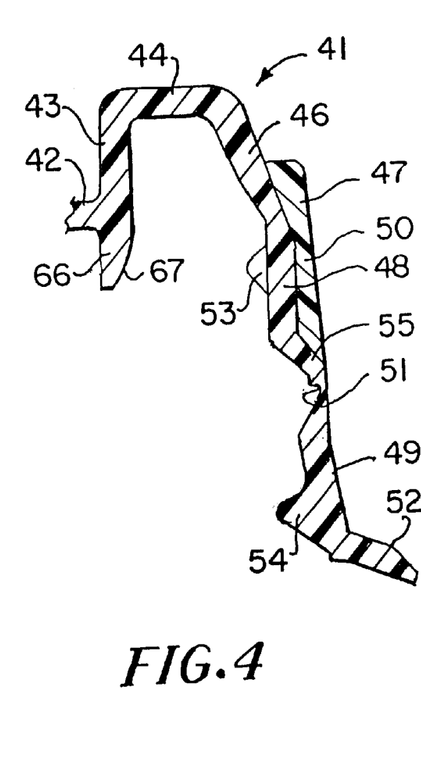
FIG. 4 is an enlarged sectional view of a portion of FIG. 3.
Figure 12:
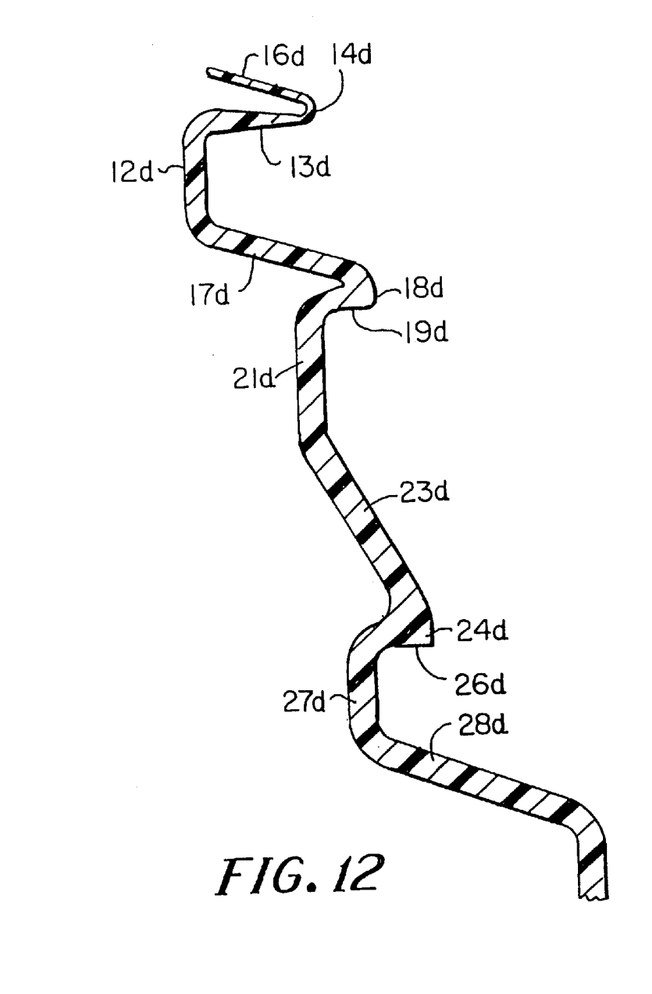
FIG. 12 is an enlarged view of the neck structure showing an alternate seal area.

Neck 11 is formed on a thin-walled jar or other container and has a curved primary seal surface 12 which is very smooth and is distinguished by the absence of parting lines inasmuch as it is formed by air pressure or other mechanical means during the blow molding process and is not formed by the mold halves and thus does not have a mold parting line formed therein. As shown in FIG. 12, seal surface 12 may be vertical or it may be curved, as shown in FIG. 2. Further, the primary sealing surface has minimal ovality, by reason of the way it is formed. Above surface 12 the neck structure extends outwardly in a outward stretch 13 which terminates in an upward bend 14. Above bend 14 is a thin, tapered upward-inward extending flange 16, the inner edge of which is of greater diameter than the diameter of surface 12. Below surface 12 the neck extends downwardly-outwardly in a slanted stretch 17 which terminates in a short vertical stretch 18, there being an inward directed substantially horizontal upper shoulder 19 below surface 18. Vertical stretch 21 extends downwardly from the inner edge of shoulder 19 terminating in an inwardly curved portion 22 which merges with an outward downward stretch 23. An approximately vertical short surface 24 (of greater diameter than surface 18) terminates in a second or lower horizontal inward directed shoulder 26. Vertical stretch 27 depends from the inner edge of shoulder 26, merging with an outward stretch 30 which merges with an outward downward stretch 29. The lower end of stretch 29 merges with an inward downward stretch 31.

In accordance with one form of standard blow molding practice, a parison of the plastic material from which the container is to be formed is deposited in the split mold. Air is blown into the parison to expand it to fill the mold. In one form of the present invention, the mold has inserts which shape the finish of the neck of the container heretofore described and above these neck inserts the mold widens out to establish what is known as a blow dome of excess material. The blow dome is severed from the neck finish by well-known means. In accordance with the present invention, as distinguished from prior neck finishes, the blow mold is severed at the inner edge of flange 16. Severing the edge of the neck from the blow dome may cause a rough surface. One of the advantages of the present invention is that the edge at which the blow dome is severed is not the primary sealing surface 12. Thus directing attention to FIG. 2, blow dome 33 has an outward upward slanted stretch 34 merging into a curved stretch 36 which has an inward slanted stretch 37. The cut line 38 is a circle wherein the stretch 34 is severed from the inner edge of flange 16. By reason of the almost 180° bend 14, and the rapid diameter changes within a relatively short vertical distance flange 16 is thin and flexible.

Another way to achieve the neck structure of the present invention is to employ what is commonly referred to as "pull-up" trim. In this case the cut line 38 is achieved by having a close diametrical fitting of a blow pin positioned internally within the parison and sets of shear steels mounted on the split mold. Diameters of the blow pin are typically 0.001 inch to 0.004 inch smaller than that diameter defined by the shear steels in closed position. After blowing of the neck and container, the portion of the parison above cut line 38 is severed from the neck portion below cut line 38 by upward movement of the blow pin relative to the shear steels.

It will be understood that the type plastic used to mold neck 11 may be any suitable relatively hard plastic such as polyethylene.

Figure 5:
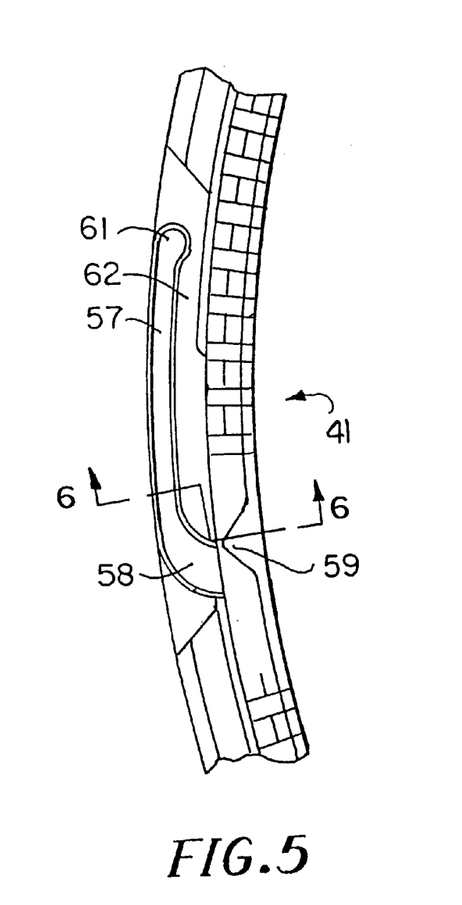
FIG. 5 is a further enlarged fragmentary bottom plan view of a portion of the cap showing a top view of the pull tab.
Figure 6:
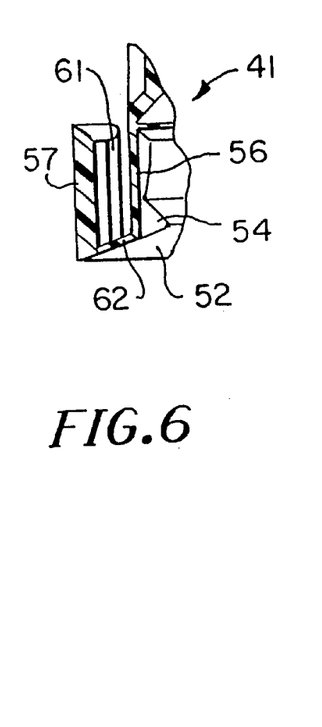
FIG. 6 is a fragmentary sectional view taken substantially along the line 6—6 of FIG. 5.
Figure 7:
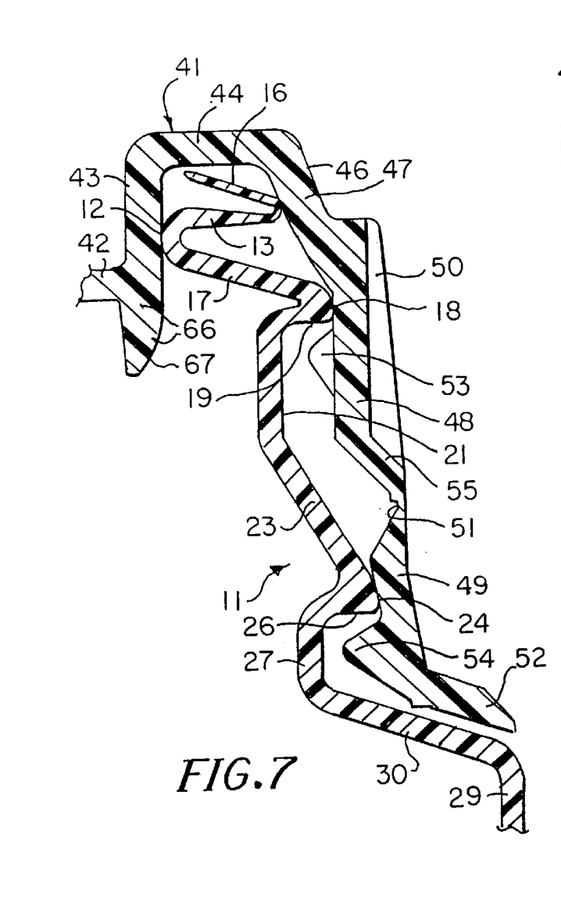
FIG. 7 is an enlarged sectional view showing schematically the seating of the cap on the neck.

One form of closure or cap used with the present invention is shown in FIGS. 3–7. The closure of FIGS. 3–7 comprises an indented circular top 42 having a short peripheral cylindrical upward extending member 43 from which extends outwardly a stack rim 44. The outer edge of rim 44 has a depending downward stretch 46 which merges into vertical, substantially cylindrical upper outer skirt 48. The lower end of skirt 48 merges into an outward downward slanted stretch 55. Below stretch 55 is the lower substantially cylindrical outer skirt 49. An internal scoreline 51 separates stretch 55 from lower skirt 49. Below lower skirt 49 the cap has an outward downward slanted flange 52 which, for practical purposes, rests against the surface 30 of neck 11. Interrupted upper inner bead sections 53 engage under the shoulder 19. Lower inner bead 54 at the lower end of skirt portion 49 engages under the shoulder 26. When the cap is attached, the beads 53 and 54 prevent cap 41 from being removed from neck 11. In order to enable the user to grip cap 41, ribs 50 extend outwardly from member 48 merging with the outer surface of lower skirt portion 49 as best shown in FIG. 7. Ribs 50 also impart columnar strength to the closure to transfer vertical force and prevent closure collapse during axial application of the closure to the finish.

At one portion of the circumference of lower skirt 49 (as best shown in FIGS. 5 and 6), spaced downwardly therefrom is a horizontal pull tab 57 having a curved connection 58 to skirt 49. The interior of skirt 49 is formed with a notch 59 where tab 57 joins lower skirt 49. Notch 59 forms a vertical line of weakness through skirt 49. Enlargement 61 is formed on the distal edge of pull tab 57. The flanged 52 is formed thinner than the rest of flange 52 in the thin area 62 adjacent tab 57.

As a downward extension of cylindrical member 43 the cap 41 is formed with a depending skirt extension 66, the lower inner edge of which is formed with a radius 67. The inner surface of member 43 seals against primary seal surface 12. The vertical position of cap top 42 can be adjusted to provide for compression of surface 12 against the adjacent surface of member 43.

Directing attention to FIG. 7 it will be seen that the surface 12 is the primary sealing surface against the member 43. As has been noted, the surface 12 is very smooth and hence forms a very effective seal against the member 43.

When the cap is applied, the beads 53 and 54 lock under the shoulders 19 and 26 to prevent removal of the cap and hence are tamper evidencing. When the user wishes to open the container, the user grips the enlargement 61 and bends the pull tab 57 outwardly and then pulls circumferentially, tearing the lower skirt 49 from the upper cap portion. The user may then grip under the surface 55 which, as shown in FIG. 7, is spaced from the bottle finish by a considerable gap, and pull upwardly causing the interrupted upper bead segments 53 to disengage from shoulder 19 so that the cap may be removed. The ribs 50 rigidify the upper portion of the cap to allow the forces necessary to push the cap onto the bottle from causing the cap to buckle. The portion of the cap above line 51 constitutes a reclosure cap and may be pressed back on the neck after portions of the contents of the jar are dispensed as frequently as required.

Figure 8:
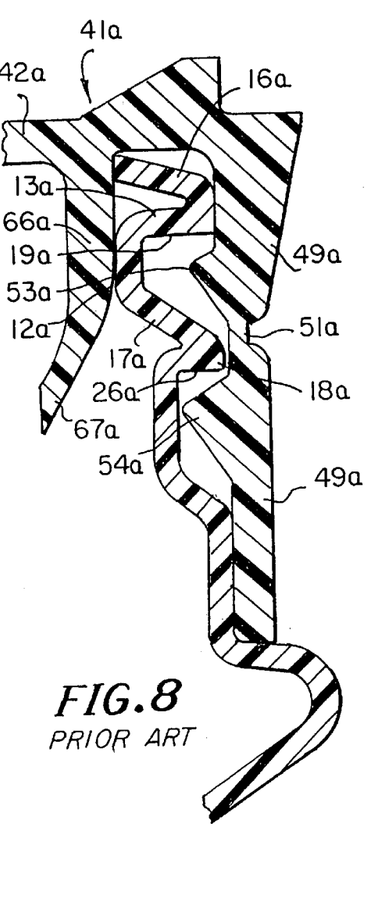
FIG. 8 is a view similar to FIG. 7 of a prior art device.

Comparison of FIG. 7 with prior art structure shown in FIG. 8 shows that in the present invention the very smooth surface 12 causes a tight seal against the exterior of member 43 and the flange 16 need not seal at all, whereas in the prior art the cut inner edge of the flange is a primary seal. The primary seal surface 12 has minimum deviation from ovality as compared to FIG. 8 where the primary seal is coincident with a trim surface. Bottles of this type of this invention and the prior art were molded. The ovality of the two types was measured. The unexpected result of these experiments was that the current invention produced a significantly more circular primary seal area. Refer to Table A. for tabulated results. The stretch occurring on both sides of the primary seal 12 is primarily contributing to the superior ovality and differentiate it from prior art.

TABLE A

| STD BOTTLE STYLE | | | | PRESENT INVENTION | | | |
| --- | --- | --- | --- | --- | --- | --- | --- |
| Run A | Run B | Run C | Run D | Run A | Run B | Run C | Run D |
| 0.055 | 0.020 | 0.048 | 0.028 | 0.024 | 0.058 | 0.002 | 0.015 |
| 0.053 | 0.002 | 0.056 | 0.015 | 0.006 | 0.010 | 0.106 | 0.030 |
| 0.062 | 0.000 | 0.044 | 0.010 | 0.017 | 0.002 | 0.013 | 0.010 |
| 0.043 | 0.010 | 0.058 | 0.003 | 0.016 | 0.004 | 0.005 | 0.027 |
| 0.058 | 0.029 | 0.025 | 0.009 | 0.014 | 0.013 | 0.005 | 0.034 |
| 0.064 | 0.016 | 0.055 | 0.003 | 0.011 | 0.060 | 0.017 | 0.017 |
| 0.011 | 0.005 | 0.059 | 0.002 | 0.004 |  | 0.003 | 0.017 |
| 0.019 | 0.013 | 0.049 | 0.005 | 0.007 |  |  |  |
| 0.042 | 0.006 | 0.045 | 0.002 | 0.013 |  |  |  |
| Average 0.028 | | | | Average 0.016 | | | |

Figure 11:
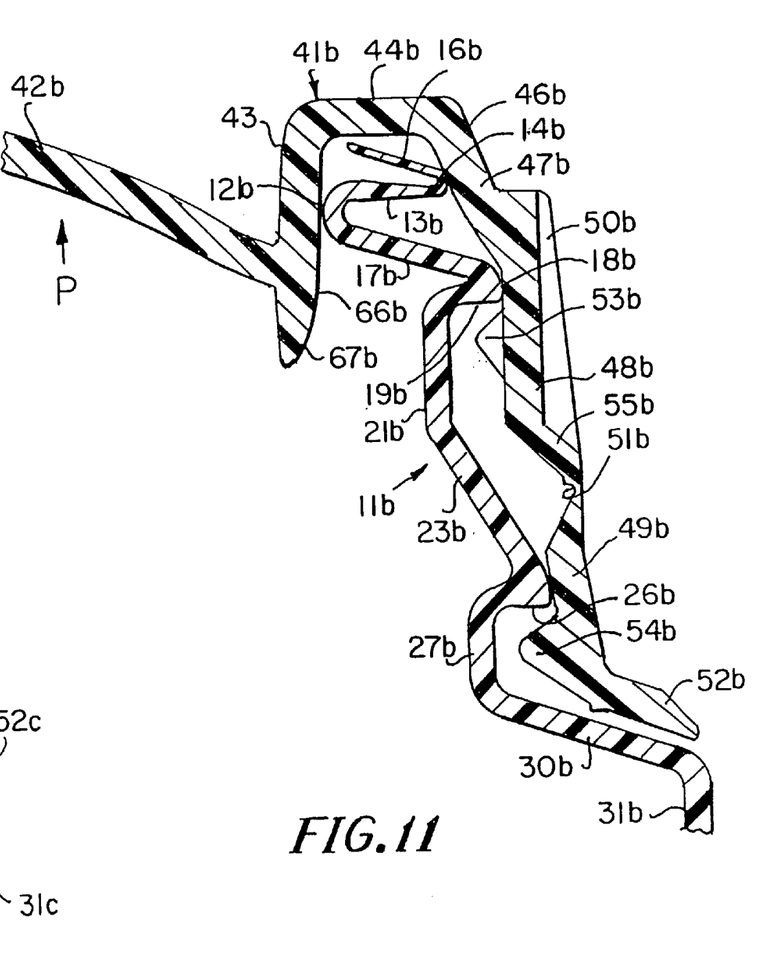
FIG. 11 is a view similar to FIG. 7 showing possible distortion of the cap top if pressure is applied to the container.

If the contents of the container are non-viscous (e.g., brine-packed pickles) or if the walls of the container are easily squeezed during transportation or handling, top 42 may be subjected to upward pressure causing it to become "domed" (outwardly convex). Such action may cause the inner skirt member 43 to pivot away from curved primary seal 12, resulting in leakage. This effect is illustrated in FIG. 11.

Figure 9:
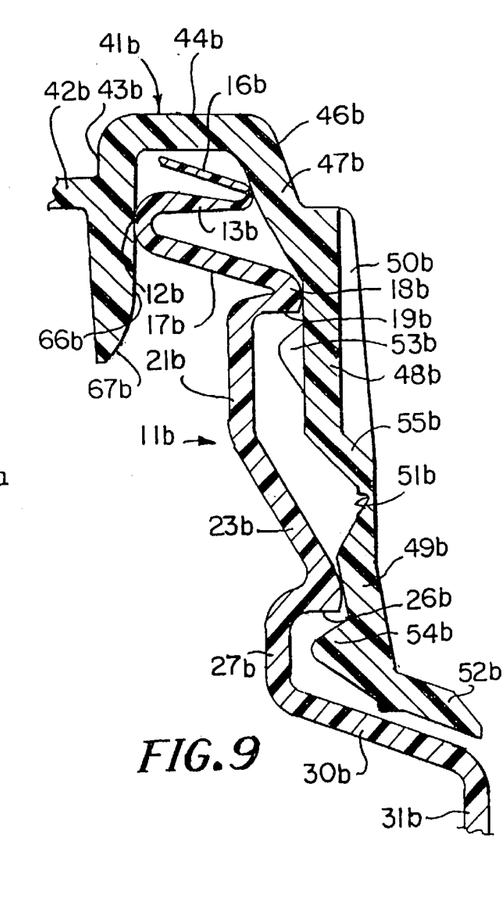
FIG. 9 is a view similar to FIG. 7 of a modification.

FIG. 9 shows one remedy for such leakage. Contrasting FIG. 9 with FIG. 7 it will be seen that top 42b is raised relative to stack rim 44b and that the contact of surface 12b with inner skirt member 43b is more closely opposite top 42b. In addition, reducing the vertical spacing between top 42b and stack rim 44b reduces the lever arm and corresponding mechanical advantage of the inward force component generated by internal pressure. Hence doming of top 42b does not result in pivoting of skirt 66b out of sealing contact with surface 12b. FIG. 11 shows how pressure applied to the container (as by squeezing the side wall) may cause top 42b to bow upward, pulling plug 66b away from such surface 12b.

Figure 10:
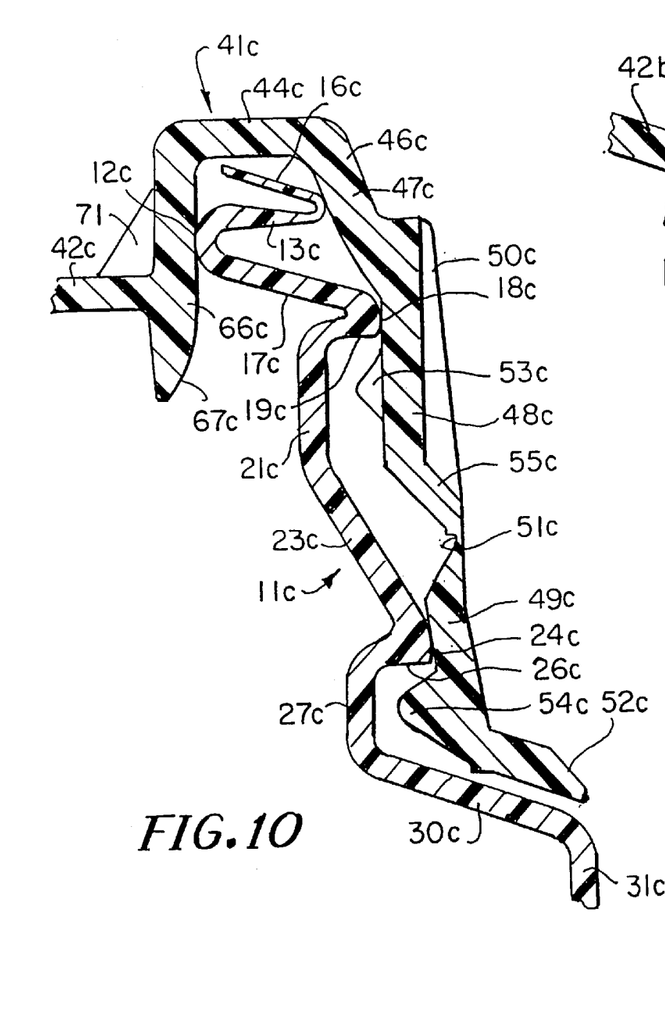
FIG. 10 is a view similar to FIG. 7 of another modification.

FIG. 10 shows another remedy for leakage due to doming of surface 42c. A plurality of angularly spaced, substantially radially gussets 71 are formed at the intersection of top 42c and cylindrical member 43c. Gussets 71 prevent member 43c from pivoting away from surface 12c. A similar result can be achieved by replacing gussets 7 with a continuous reinforcing bead or shoulder at the intersection of the exterior surfaces of top 42c and member 43c.

FIG. 12 illustrates a shape wherein seal surface 12d is cylindrical rather than curved.

Figure 13:
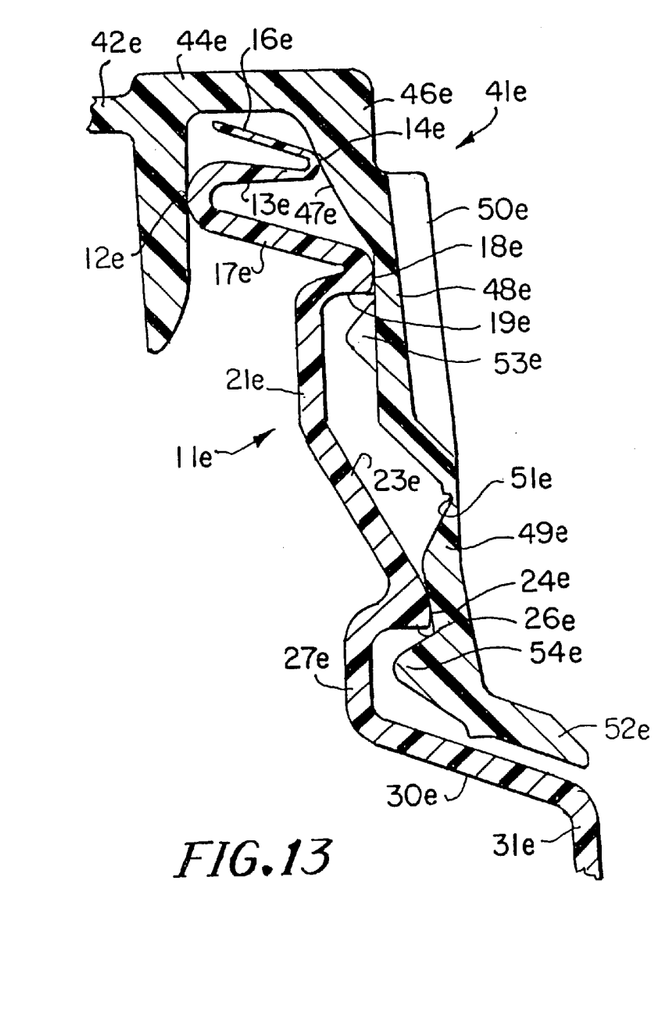
FIG. 13 is a view similar to FIGS. 9 and 10 showing modified sealing surface positions.

FIG. 13 shows a structure in which top 42c is closer to the level of rim 44e. Surface 12e engages the surface of cylinder 43e below the level of top 42e.

Figure 14:
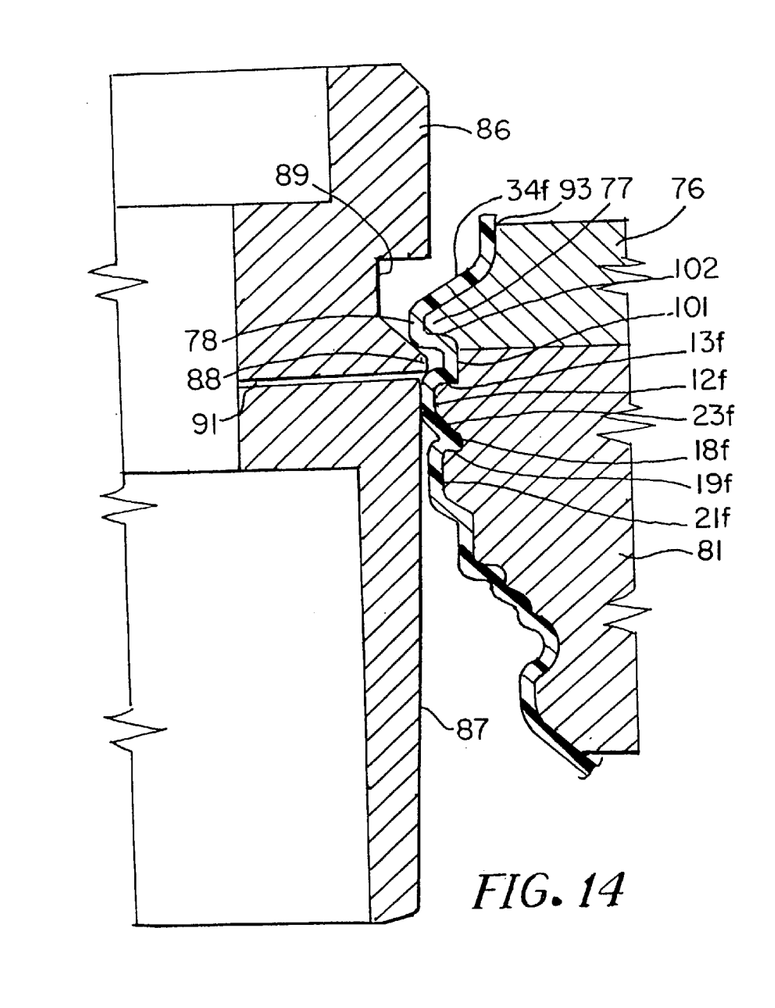
FIG. 14 is a vertical sectional view through a modified container neck and portions of the mold and blow pin forming same.
Figure 15:
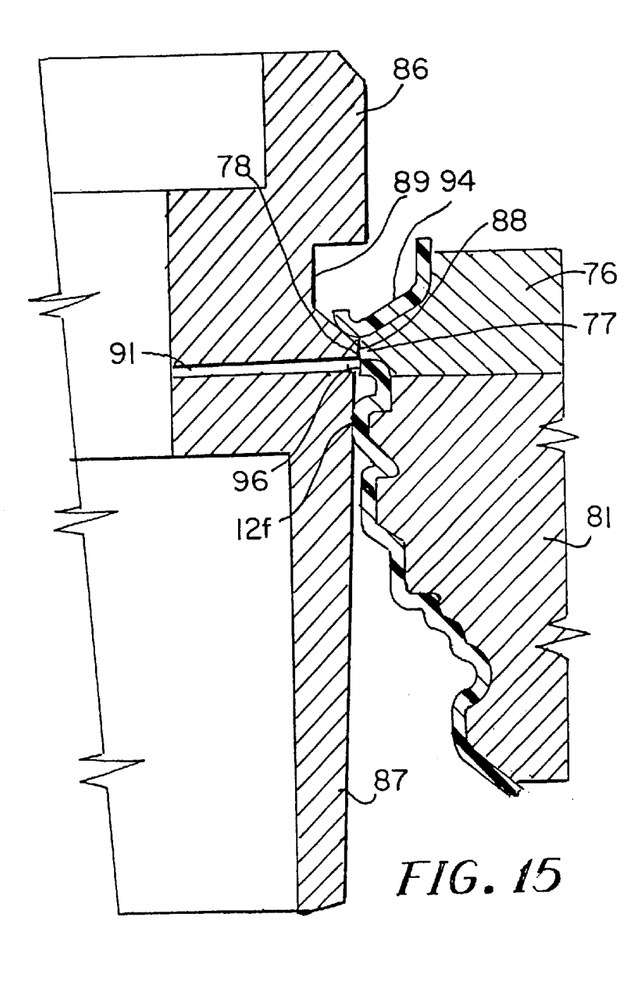
FIG. 15 is a view of similar to FIG. 14, showing the blow pin in raised position.

Directing attention to the modification shown in FIGS. 14 and 15, formation of a modified container neck is shown. Such a neck may resemble that shown in FIGS. 1 and 2 of U.S. Pat. No. 4,699,287, with an important modification, as hereinafter explained. In FIG. 14 the parison forming the neck is shown between a blow pin 86 and shear steel 76 and neck insert 21 as molding is being completed.

Shear steel 76 has an inward projection 77 terminating in a vertical inward extending shearing edge 78. Blow pin 86 has a lower cylindrical portion 87 having an outward extending shearing edge 88 with a groove 89 thereabove.

As shown in FIG. 14, blow molding of the parison to the shape of shear steel 76 and neck insert 81 has just been completed. The shape of the parison generally resembles the neck shown in said U.S. Pat. No. 4,699,287. Edge 88 is located below edge 78. Air blowing through hole 91 has formed vertical stretch 101 and inward horizontal stretch 102 as well as the portions thereabove. The smooth, vertical, lower cylindrical portion 87 has formed internal primary seal surface 12f.

The blow pin 86 then moves from the position of FIG. 14 to the position of FIG. 15. The neck structure is sheared between edges 78 and 88. Inner flange edge 96 is formed where the edges 78, 88 have sheared the same and the parison sheared-off portion 94 thereabove is discarded.

It is noted that edge 96 is of a larger diameter than primary seal surface 12f, hence the hollow plug or inner skirt of a cap such as that shown in U.S. Pat. No. 4,699,287 seated on the container neck seals against surface 12f instead of surface 96. Since blow pin 86 has no parting line surface 12f has no flash. Surface 12f is smooth and its diameter is always the same during repetitive molds and hence makes a superior seal with the cap plug.

In FIGS. 8, 9, 10, 12, 13 and 14 in general, the same reference numerals are used for parts corresponding to FIG. 7, followed by subscripts a, b, c, d, e and f respectively.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A neck for a blow-molded plastic container for use with a cap having a top, an outer skirt depending from the top and a plug substantially vertically depending from the top, the plug being located inward of the outer skirt with an annular gap between the skirt and the plug, said neck comprising a sealing portion having a smooth, internal circumferential primary seal surface characterized by the absence of mold parting lines positioned and dimensioned to sealingly engage the plug, an outward bend at an upper end of said sealing portion, an outward extending stretch beyond said outward bend, an upward-inward bend at an outer end of said outward extending stretch, and an inwardly-upwardly extending flange beyond said upward-inward bend, said flange terminating at a trim line having a circumference greater than that of said sealing portion so that said trim line does not engage the plug of the cap to form a primary seal, whereby said trim line is outward of the plug of the cap in the assembled position of said neck and the cap, said flange being thin and flexible.

2. A neck according to claim 1 in which said sealing portion is circular in plan view with a minimal variation from ovality.

3. A neck according to claim 1 in which said internal primary seal surface is curved in vertical cross section.

4. A neck according to claim 1 in which said internal primary seal surface is substantially straight in vertical cross-section.

5. A neck according to claim 1 in which no part of said neck above said sealing portion is thicker than said neck at said sealing.

6. A neck according to claim 1 in which said outward stretch is spaced apart from said flange and diverges from said flange.

7. A neck according to claim 1 in which said flange has a bottom surface spaced from said outward stretch.

8. In combination, a neck for a blow molded plastic container and a cap, said cap having a top, an outer skirt depending from said top and a plug substantially vertically depending from said top, said plug being located inward of said outer skirt with an annular gap between said outer skirt and said plug, said neck comprising a sealing portion having a smooth, internal circumferential primary seal surface characterized by the absence of mold parting lines sealingly engaging said plug, an outward bend at an upper end of said sealing portion, an outward extending stretch beyond said outward bend, an upward-inward bend at an outer end of said outward extending stretch, and an inwardly-upwardly extending flange beyond said upward-inward bend, said flange terminating at a trim line having a circumference greater than that of said sealing portion, said trim line being spaced from said plug and not sealing against said plug, said trim line being located outward of said plug, said outward bend, outward extending stretch, upward-inward bend and flange being located in said annular gap.

9. The combination of claim 8 in which said outward extending stretch engages said outer skirt.

10. The combination of claim 8 in which said cap further comprises neck engaging means on said outer skirt and in which said neck has a lower portion extending outwardly-downwardly from said sealing portion and which further comprises cap engaging means on said lower portion located below said sealing portion, said cap engaging means being positioned to engage said neck engaging means.

11. The combination of claim 10 in which said lower portion is formed with a detachable portion, said cap engaging means being located on said detachable portion.

12. The combination of claim 8 in which said outer skirt comprises an upper skirt portion having a first downward-outward slanted stretch below said top, a substantially cylindrical stretch below said first slanted stretch, a second downward-outward slanted stretch below said cylindrical stretch and a lower skirt portion depending from a lower end of said second downward-outward slanted stretch, said outer skirt being formed with a frangible line of weakness between said second downward-outward stretch and lower skirt portion and which further comprises tear off means for tearing off said lower skirt portion at said frangible line of weakness.

13. The combination of claim 12 in which said tear off means comprises a horizontal tear tab, means joining one end of said tear tab to said lower skirt portion and a notch in said lower skirt portion adjacent said one end of said tear tab.

14. The combination of claim 12 which further comprises vertical external ribs extending from said cylindrical stretch and said second downward-outward stretch.

15. The combination of claim 8 in which said top comprises a cylindrical member extending above and below said top and an indented central portion inward of said cylindrical member, said cap further comprising a rim extending outward of said cylindrical member, said outer skirt depending from the outer edge of said rim, said sealing portion engaging said cylindrical wall.

16. The combination of claim 15 in which said sealing portion engages said cylindrical member above said indented central portion.

17. The combination of claim 15 in which said sealing portion engages said cylindrical member substantially at said indented central portion.

18. The combination of claim 15 in which said sealing portion engages said cylindrical member below said indented central portion.

19. The combination of claim 15 in which said cap further comprises a plurality of radial, angularly-spaced gussets at an intersection of said indented central portion with said cylindrical member.

20. A neck for a blow-molded plastic container for use with a cap having a top, an outer skirt depending from the top and a plug substantially vertically depending from the top, the plug being located inward of the outer skirt with an annular gap between the skirt and the plug, said neck comprising a sealing portion having a smooth, internal circumferential primary seal surface characterized by the absence of mold parting lines positioned and dimensioned to sealingly engage the plug, an outward bend at an upper end of said sealing portion, an outward extending stretch beyond said outward bend, an upward-inward bend at an outer end of said outward extending stretch, and an inwardly-upwardly extending flange beyond said upward-inward bend, said flange terminating at a trim line having a circumference greater than that of said sealing portion whereby said trim line is outward of the plug of the cap in the assembled position of said neck and the cap, said flange being thin and flexible, a horizontal distance between said sealing portion and said upward-inward bend being greater than a vertical distance between a midpoint on said sealing portion and said trim line.

21. In combination, a neck for a blow molded plastic container and a cap, said cap having a top, an outer skirt depending from said top and a plug substantially vertically depending from said top, said plug being located inward of said outer skirt with an annular gap between said outer skirt and said plug, said neck comprising a sealing portion having a smooth, internal circumferential primary seal surface characterized by the absence of mold parting lines sealingly engaging said plug, an outward bend at an upper end of said sealing portion, an outward extending stretch beyond said outward bend, an upward-inward bend at an outer end of said outward extending stretch, and an inwardly-upwardly extending flange beyond said upward-inward bend, said flange terminating at a trim line having a circumference greater than that of said sealing portion, said trim line being located outward of said plug, said outward bend, outward extending stretch, upward-inward bend and flange being located in said annular gap, a horizontal distance between said sealing portion and said upward-inward bend being greater than a vertical distance between a midpoint on said sealing portion and said trim line.

22. An intermediate article of manufacture for subsequent trimming to form a neck for a blow-molded plastic container for use with a cap having a top, an outer skirt depending from the top and a hollow plug substantially vertical depending from the top, the plug being located inward of the outer skirt with an annular gap between the skirt and the plug, said article of manufacture comprising a sealing portion having a smooth, internal, circumferential primary seal surface characterized by the absence of mold parting lines positioned and dimensioned to sealingly engage the plug, an outward bend at an upper end of sealing portion, an outward extending stretch beyond said outward bend, an upward-inward bend at an outer end of said outward extending stretch, and an inwardly-upwardly extending flange beyond said upward-inward bend, said flange having a terminus having a circumference greater than said sealing portion, and a blow dome extending upwardly-outwardly of said terminus, said terminus comprising a trim line for subsequently trimming off said blow dome.

\* \* \* \* \*